(12) United States Patent
Defilippis

(10) Patent No.: US 8,356,787 B2
(45) Date of Patent: Jan. 22, 2013

(54) METHOD AND APPARATUS FOR A BWR JET PUMP MAIN WEDGE CLAMP

(75) Inventor: Michael S. Defilippis, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 201 days.

(21) Appl. No.: 12/839,948

(22) Filed: Jul. 20, 2010

(65) Prior Publication Data

US 2012/0018612 A1 Jan. 26, 2012

(51) Int. Cl.
*A47G 1/00* (2006.01)

(52) U.S. Cl. .................................. 248/316.1; 248/670

(58) Field of Classification Search .............. 248/316.1, 248/316.2, 316.4, 316.6, 316.8, 229.1, 229.11, 248/229.12, 229.14, 229.21, 229.22, 229.24, 248/229.15, 229.26, 670, 674
See application file for complete search history.

(56) References Cited

U.S. PATENT DOCUMENTS

| | | | |
|---|---|---|---|
| 3,385,545 A | 5/1968 | Patton | |
| 5,978,433 A | 11/1999 | Erbes et al. | |
| 6,609,343 B1 | 8/2003 | Litten | |
| 7,931,245 B2 * | 4/2011 | Mills et al. | 248/231.71 |
| 2002/0030148 A1 * | 3/2002 | Oddsen, Jr. | 248/314 |
| 2008/0042027 A1 * | 2/2008 | LaScala | 248/229.15 |
| 2008/0251651 A1 | 10/2008 | Jackson et al. | |
| 2009/0078840 A1 * | 3/2009 | Wolvin | 248/229.15 |
| 2012/0032064 A1 | 2/2012 | Defilippis et al. | |
| 2012/0033781 A1 | 2/2012 | DeFilippis | |
| 2012/0033782 A1 | 2/2012 | DeFilippis et al. | |
| 2012/0049025 A1 * | 3/2012 | Halverson et al. | 248/229.22 |

OTHER PUBLICATIONS

US Office Action dated Nov. 25, 2011 for co-pending U.S. Appl. No. 12/850,218.
U.S. Office Action dated Oct. 26, 2012 for related co-pending U.S. Appl. No. 12/850,218.

* cited by examiner

*Primary Examiner* — Ramon Ramirez
(74) *Attorney, Agent, or Firm* — Harness, Dickey & Pierce, P.L.C.

(57) ABSTRACT

A method and apparatus for vertically lifting and supporting a main wedge of a Boiling Water Reactor (BWR) jet pump restrainer assembly, to ensure that the wedge is no longer contacting a restrainer bracket of the restrainer assembly. A main wedge clamp with an upper and lower clamp jaw is used to attach to the upper support of the restrainer assembly, the lower clamp jaw being fashioned with a prong or prongs that fit underneath the crown of the main wedge and provide the vertical lift for the main wedge.

17 Claims, 5 Drawing Sheets

METHOD AND APPARATUS FOR A BWR JET PUMP MAIN WEDGE CLAMP

BACKGROUND OF THE INVENTION

1. Field of the Invention

Example embodiments relate generally to nuclear reactors, and more particularly to a method and apparatus for a Boiling Water Reactor (BWR) jet pump main wedge clamp that physically restrains a BWR jet pump main wedge, to prevent wear to the wedge and a jet pump restrainer bracket.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within jet pump restrainer brackets by a gravity actuated wedge. The restrainer brackets support the inlet mixer by attaching the inlet mixer to the adjacent jet pump riser pipe.

The jet pump main wedge maintains contact between the inlet mixer and the jet pump restrainer bracket. More specifically, the wedge works in cooperation with two set screws which are tack welded to the restrainer bracket to maintain contact with the inlet mixer. The flow of water through the jet pumps typically includes pressure fluctuations caused by various sources in the reactor system. The pressure fluctuations may have frequencies close to one or more natural vibration modes of the jet pump piping. The jet pump piping stability depends on the tight fit-up, or contact, of the restrainer brackets and the inlet mixers. The vibrations present in the jet pump system cause excessive movement of the main wedge against the restrainer bracket and main wedge rod resulting in subsequent damage to the various contact surfaces. Previously worn main wedges and restrainer brackets required replacement and/or new wear surfaces which may be bolted onto the existing restrainer bracket. These procedures have been found to require a significant and expensive downtime of the jet pumps.

Disassembly and/or complete removal of the restraining bracket and wedge can, in and of itself, be expensive. Therefore, a need exists to remove the main wedge from active use by vertically lifting the main wedge away from direct contact with the restraining bracket, thereby allowing the wedge and restrainer bracket to remain attached to the inlet mixer while ensuring that no additional wear occurs between the wedge and the restrainer bracket.

SUMMARY OF INVENTION

Example embodiments provide a method and an apparatus for providing vertical support of a jet pump main wedge in a jet pump restrainer assembly. Specifically, a clamping or restraining device may be used to vertically lift the jet pump main wedge in a fixed position, typically against the upper support and away from any contact with the restrainer bracket. By clamping the wedge in position, wear between the wedge and the restrainer bracket is eliminated, as the wedge and restrainer bracket are no longer in direct contact.

Because example embodiments remove the restrainer bracket and main wedge from active use, it may be advantageous to use alternative means to restrain the inlet mixers which may be implemented in conjunction with example embodiments. Alternative means of restraining the inlet mixer may be accomplished for instance by providing additional side loading to the inlet mixer, as described in the General Electric Hitachi application "METHOD AND APPARATUS FOR A BWR JET PUMP SUPPORT SYSTEM," Ser. No. 12/850,218.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
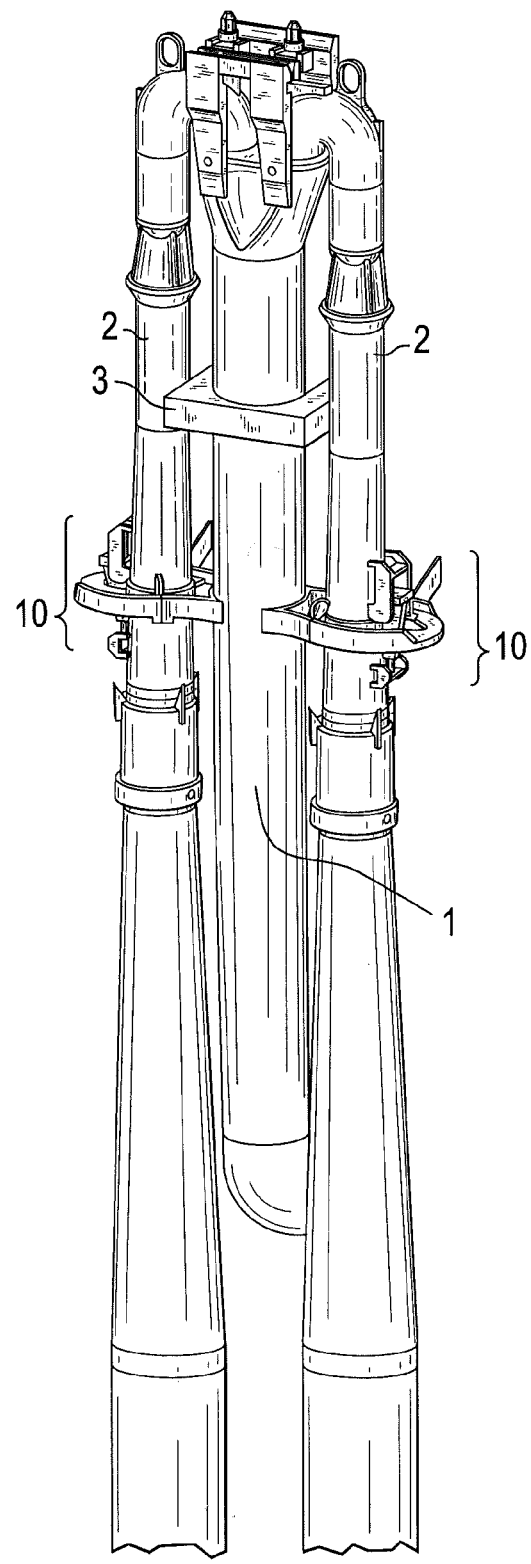
FIG. 1 is a perspective view of a conventional boiling water nuclear reactor jet pump assembly.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Referring to FIG. 1, a perspective view of a conventional Boiling Water Reactor (BWR) nuclear reactor jet pump assembly is depicted. The jet pump assembly includes conventional jet pump restrainer assemblies 10 attached to the riser pipe 1, which stabilize any movement of the inlet mixers 2 relative to the riser pipe 1 while the jet pump assembly is in use.

Figure 2:
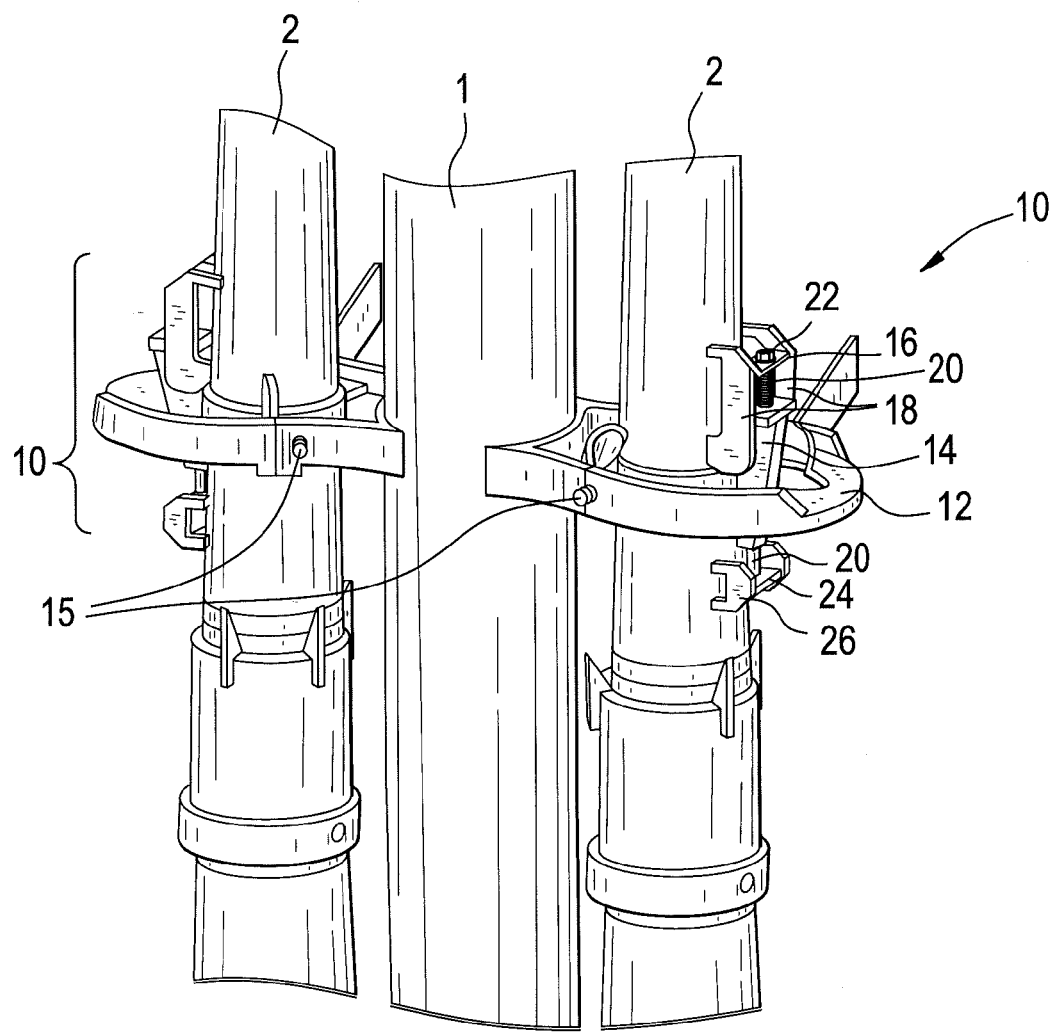
FIG. 2 is a detailed view of a conventional jet pump restrainer assembly.

FIG. 2 shows a detailed view of the conventional jet pump restrainer assemblies 10 on the riser pipe 1. The restrainer assembly 10 includes a restrainer bracket 12 Connected to the riser pipe 1. Three points of contact locate the inlet mixer 2 in the restrainer bracket 12. The three points of contact are two set screws 15, located approximately between each inlet mixer 2 and the riser pipe 1 (only one set screw 15 is shown, with the other set screw 15 on the back-side of the FIG. 2 image), and the main wedge 14 (the main wedge 14 is the third point of contact). The main wedge 14 assists in ensuring that the restrainer bracket 12 remains against the two set screws 15. The main wedge 14 is free to move vertically along the wedge rod 20 and is held in place between the inlet mixer 2 and restrainer bracket 12 by gravity. The bottom of the wedge rod 20 is held in place by a lower support including two vertical plates 26 and a horizontal plate 24 (notice the bottom of wedge rod 20 penetrates and is held fast on the horizontal plate 20 of the lower support). The top of the wedge rod 20 is held in place by an upper support including two vertical plates 18 and a horizontal plate 16 (notice the top of wedge rod 20 penetrates and is held fast on the horizontal plate 16 via nut 22).

Figure 3:
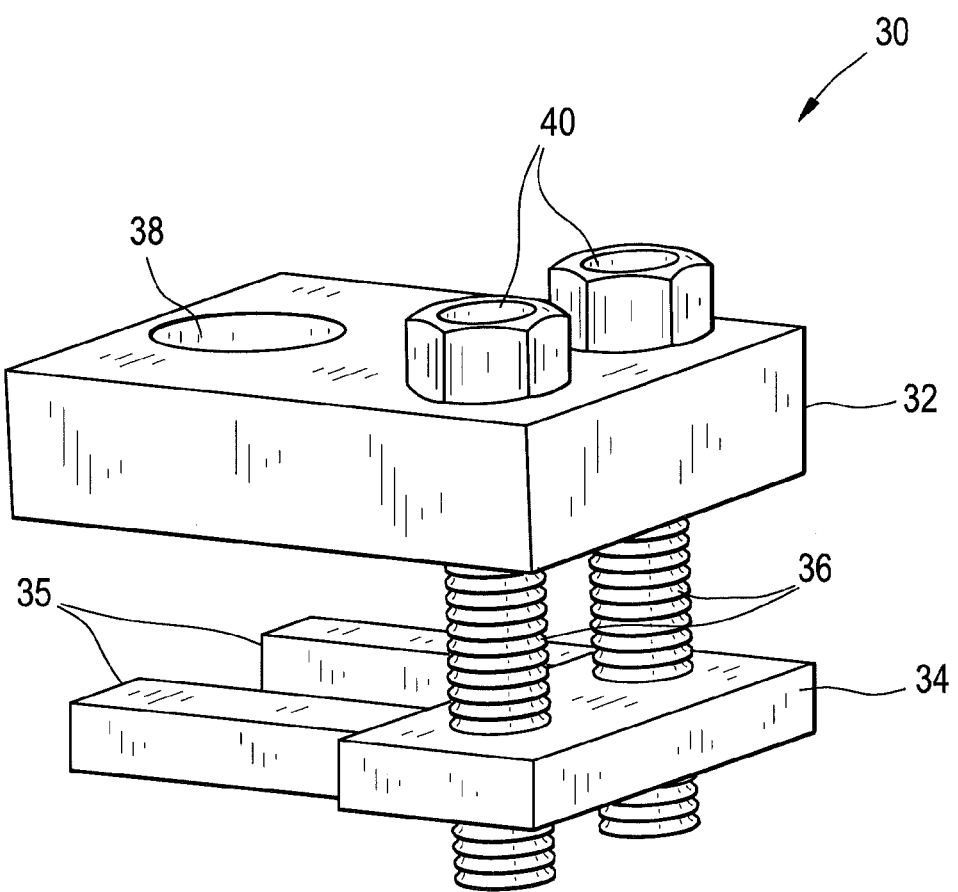
FIG. 3 is a side view of a jet pump main wedge clamp, in accordance with example embodiments.

FIG. 3 is a side view of a jet pump main wedge clamp 30, in accordance with example embodiments. The wedge clamp 30 may include a lower clamp jaw that may be a plate with one ore more prongs 35 protruding away from a distal end of the lower clamp jaw 34 plate. The prongs 35 may be sized to fit between the main wedge 14 and a vertical plate 18 of the upper support of the restrainer assembly 10. The wedge clamp 30 may also include an upper clamp jaw 32 that may be a plate with a clearance hole 38 running through the upper clamp jaw 32. The clearance hole 38 may be located near the distal end of the upper clamp jaw 32 plate. The clearance hole 38 may be sized to allow the wedge rod 20 and nut 22 (shown in FIGS. 2 and 5) to fit through the clearance hole 38. The upper clamp jaw 32 plate may be sized to fit between the vertical plates 18 of the upper support of a jet pump restrainer assembly 10. Both the upper clamp jaw 32 plate and the lower clamp jaw 34 plate may both have an approximate width of 4 inches (to allow the plates to fit between the vertical plates and 18), and an overall length of about 5 inches. Both upper clamp jaw 32 plate and lower clamp jaw 34 plate may have a thickness of about 0.5 inches to 1 inch, although the thickness need not be constrained to this range.

The wedge clamp 30 may include a clamp bolt or bolts 36, or other means of attachment that is used to hold the upper clamp jaw 32 to the lower clamp jaw 34. Other means of attachment may include only one bolt, multiple bolts, or any other reasonable fixture that may be used to hold the clamp jaws 32/34 in a fixed position relative to each other. The bolts 36, or other means of attachment, may ensure that the upper clamp jaw 32 and lower clamp jaw 34 are secured to each other such that the upper clamp jaw 32 and lower clamp jaw 43 are approximately parallel to each other. The clamp bolts 36 may include nuts 40 which may hold the bolts 36 in place. The bolts 36 may be threaded, to mate with threaded connections that may be provided in one or both of the upper and lower clamp jaws 32/34. Other means of attaching bolts 36 to the clamp jaws 32/34 may include welding, adhesive, or any other means by which stable connections may be made between bolts 36 and the clamp jaws 32/34. The clamps bolt or bolts 36 may attach the proximal end of the lower clamp jaw 34 plate to the proximal end of the upper clamp jaw 32 plate.

All clamp components may be made by materials that are known to be acceptable for a nuclear environment. For instance, stainless steel (304, 316, XM-19, or equivalent) or nickel based alloys (Iconel, X-750, X-718, or equivalent) may be used.

Figure 4:
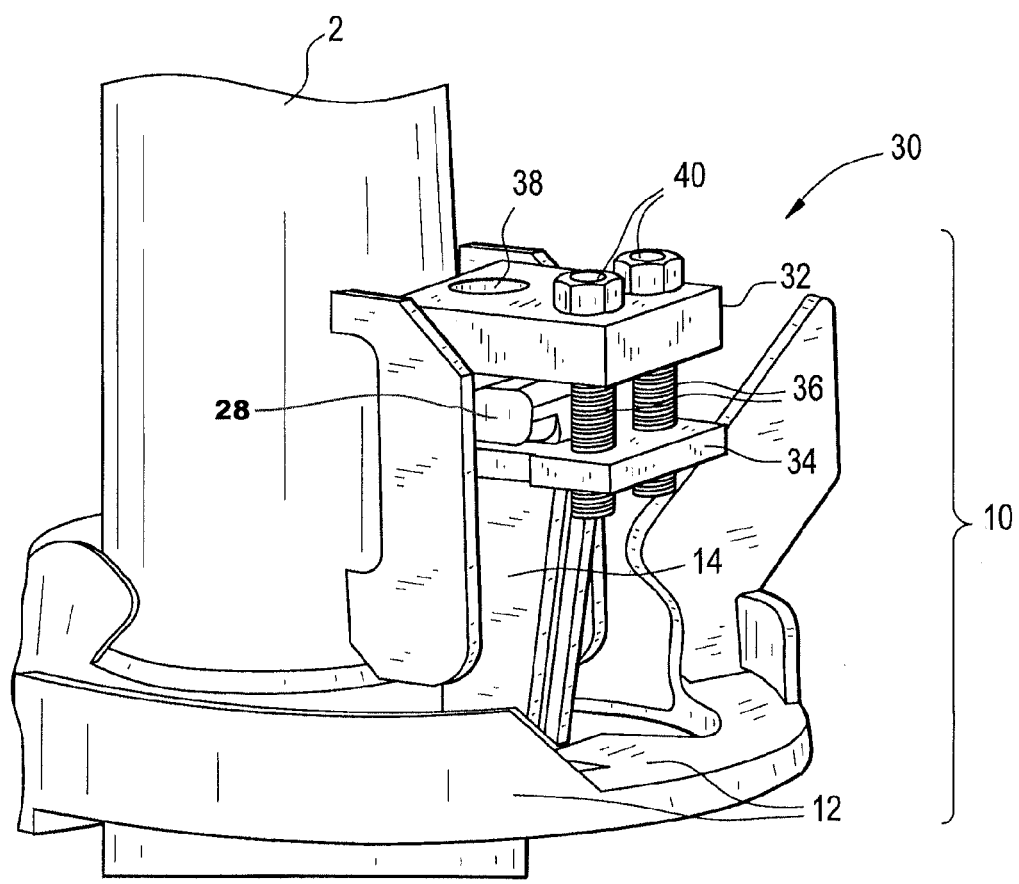
FIG. 4 is a detailed view of a jet pump main wedge clamp in use on a jet pump restrainer assembly, in accordance with example embodiments.

FIG. 4 is a detailed view of a jet pump main wedge clamp 30 in use on a jet pump restrainer assembly 10, in accordance with example embodiments. Note that the prongs 35 of the lower clamp jaw 34 may be two prongs 35 that are fitted to cradle underneath the crown 28 of the main wedge 14, and each prong 35 may be sized to fit between the side of the main wedge 14 and the vertical plate 18 of the upper support. The purpose of the lower clamp jaw 34 is to lift the main wedge 14 vertically upward and away from restrainer bracket 12 to, in essence, take the main wedge 14 out of operation without additional costly maintenance or down-time to actually remove the wedge 14 altogether.

The upper clamp jaw 32 may be fitted to exist between the two vertical plates 18, allowing the upper clamp jaw 32 to then be attached to horizontal plate 16 (partially obscured in the view of FIG. 4). Attachment to horizontal plate 16 may be through the use of wedge rod 20 and nut 22 which may run through clearance hole 38 (shown in more detail in FIG. 5). Alternatively, upper clamp jaw 32 may be attached to horizontal plate 16 by bolts or welding that may be separate from wedge rod 20 and nut 22. Additionally, the upper clamp jaw 32 may be fitted to bracket the outside of vertical plates 18 (as opposed to fitting between the two vertical plates 18), and may also be alternatively attached directly to one or both of the vertical plates 18. Alternatively, upper clamp jaw 32 may also be attached directly to the inlet mixer 2. While threaded clamp bolts 36 and nuts 40 are shown securing the upper clamp jaw 32 to the lower clamp jaw 34, any other means of stabilizing the connection between upper/lower clamp jaws 32/34 may also be implemented.

Figure 5:
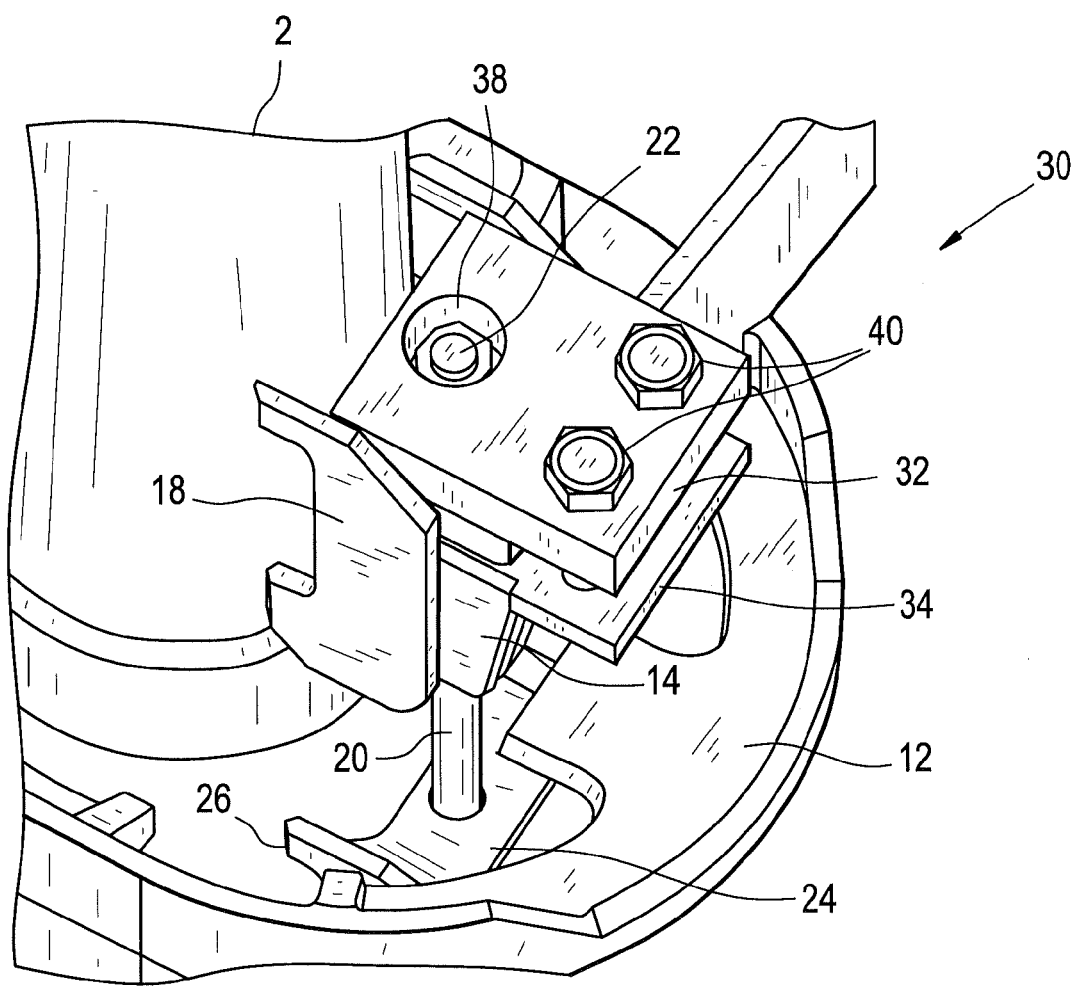
FIG. 5 is an overhead view of a jet pump main wedge clamp in use on a jet pump restrainer assembly, in accordance with example embodiments.

FIG. 5 is an overhead view of a jet pump main wedge clamp 30 is use on a jet pump restrainer assembly 10, in accordance with example embodiments. This overhead view shows an example embodiment that may include the wedge rod 20 penetrating through clearance hole 38 of upper clamp jaw 32. Clearance hole 38 may be a recessed hole that allows wedge rod nut 22 to exist within the recessed area, allowing the wedge rod 20 to easily be secured to the upper clamp jaw 32.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A wedge clamp for vertically lifting a wedge of a Boiling Water Reactor (BWR) jet pump restrainer assembly, the wedge clamp comprising:
    a lower clamp jaw that is a plate with two prongs extending from a distal end of the plate, and
    an upper clamp jaw that is a plate,
    at least a first bolt connecting the lower clamp jaw to the upper clamp jaw,
    the two prongs being configured to fit under the crown of the wedge, each prong being configured to fit between the wedge and a vertical plate of an upper support of the jet pump restrainer assembly.

2. The clamp of claim 1, wherein the upper clamp jaw includes a clearance hole near the distal end of the upper clamp jaw plate.

3. The clamp of claim 2, wherein the clearance hole is sized to allow a wedge rod of the jet pump restrainer assembly to penetrate the clearance hole.

4. The clamp of claim 3, wherein the clearance hole includes a recessed area configured to allow a nut of the wedge rod to exist in the recessed area to secure the wedge rod to the upper clamp jaw plate.

5. The clamp of claim 1, wherein the first bolt connects a proximal end of the lower clamp jaw plate to a proximal end of the upper clamp jaw plate.

6. The clamp of claim 1, wherein the first bolt is threaded, and the threads of the first bolt mate with threaded connections in at least one of the lower clamp jaw and the upper clamp jaw.

7. The clamp of claim 1, further comprising:
    at least one nut to secure the first bolt to at least one of the lower clamp jaw and the upper clamp jaw.

8. The clamp of claim 1, wherein the upper clamp jaw plate is sized to fit between a pair of vertical plates of an upper support of the jet pump restrainer assembly.

9. The clamp of claim 1, wherein the first bolt is configured to ensure that the upper clamp jaw plate and the lower clamp jaw plate are approximately parallel to each other.

10. The clamp of claim 1, further comprising:
    a second bolt connecting the lower clamp jaw to the upper clamp jaw.

11. A method of clamping a wedge of a Boiling Water Reactor (BWR) jet pump restrainer assembly, the method comprising:
    attaching a lower clamp jaw to an upper support of the jet pump restrainer assembly, the lower clamp jaw being a plate with at least one prong configured to fit under the crown of the wedge and in between the wedge and a vertical wall of the upper support,
    attaching an upper clamp jaw to the upper support, the upper clamp jaw being a plate,
    vertically lifting the wedge away from a restrainer bracket of the jet pump restrainer assembly, the at least one prong of the lower clamp jaw being used to lift the wedge,
    at least a first bolt connecting the lower clamp jaw to the upper clamp jaw and securing the wedge away from the restrainer bracket.

12. The method of claim 11, wherein the attaching of the lower clamp jaw step includes providing the lower clamp jaw with two prongs, each prong configured to fit under the crown of the wedge and in between the wedge and a vertical wall of the upper support.

13. The method of claim 11, wherein the attaching of the upper clamp jaw step includes providing the upper clamp jaw with a clearance hole at a distal end of the upper clamp jaw plate, the clearance hole being sized to allow a wedge rod of the jet pump restrainer assembly to penetrate the clearance hole.

14. The method of claim 13, further comprising:
    affixing the upper clamp jaw plate to a horizontal plate of the upper support using the wedge rod and a wedge rod nut.

15. The method of claim 13, wherein clearance hole includes a recessed area configured to allow a nut of the wedge rod to exist in the recessed area to secure the wedge rod to the upper clamp jaw plate.

16. The method of claim 11, wherein the connecting of the lower clamp jaw to the upper clamp jaw includes connecting a proximal end of the lower clamp jaw plate to a proximal end of the upper clamp jaw plate with the first bolt.

17. The method of claim 11, wherein the connecting of the lower clamp jaw to the upper clamp jaw includes connecting the upper clamp jaw plate and the lower clamp jaw plate so that the two plates are approximately parallel to each other using the first bolt.

* * * * *